Figure 1:
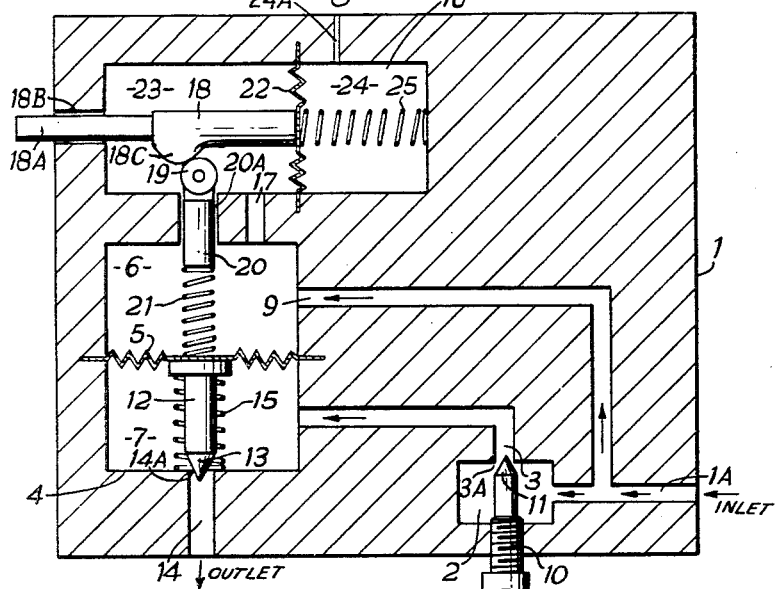

June 28, 1960

H. E. JACKSON 2,942,619

FLOW CONTROL VALVES

Filed Jan. 24, 1958

INVENTOR
Harold Ernest Jackson

ATTORNEY

United States Patent Office 2,942,619
Patented June 28, 1960

2,942,619

FLOW CONTROL VALVES

Harold Ernest Jackson, Maurice, England, assignor to Tecalemit Limited, Brentford, England Filed Jan. 24, 1958, Ser. No. 711,012

Claims priority, application Great Britain Jan. 25, 1957

7 Claims. (Cl. 137—501)

The present invention relates to a fluid flow control valve assembly which acts as a means for controlling the flow of fluid so that it will be in a desired relationship to a selected variable characteristic of the fluid, such as variation in pressure and viscosity. Among the many uses of the device of the present invention, as will occur to those skilled in the art from the following description, it has special utility in regulating the speed-fuel ratio requirements of engines.

According to the invention, the control valve assembly comprises means for relating the drop in pressure of the variable pressure fluid as it flows through an orifice in the valve assembly to any one of the said variables so as to cause the flow of the fluid passing through the valve assembly to be in a desired relationship to the said variable.

The flow of the fluid through the said orifice is controlled by a valve which is adjustable towards and away from the orifice. The orifice may be connected directly to the variable pressure fluid inlet to the valve assembly or, alternatively, it may be connected to the outlet from a pressure-generating means which acts to increase the pressure of the variable pressure fluid entering the valve assembly through the inlet to the assembly.

The fluid outlet from the valve assembly may be controlled by a valve associated with a pressure actuated means, which may be in the form of a diaphragm or equivalent, movable in a chamber, the space in the chamber on one side of the diaphragm or equivalent is connected to the said orifice while the space on the opposite side of the diaphragm or equivalent is connected to the variable pressure fluid inlet and to a second chamber containing a movable diaphragm or equivalent.

In each of two constructions which are described hereinafter, by way of example, a pressure controlling means consisting of a cam on a slidable cam member is arranged in the space on one side of the diaphragm or equivalent in the second chamber and the cam acts upon the diaphragm or equivalent in the first mentioned chamber. In one of the two constructions, however, the space on the opposite side of the diaphragm or equivalent in the second chamber is isolated from the variable pressure fluid inlet while in the other construction the corresponding space is connected to a conduit which is also connected to the said orifice.

One constructional form of the invention, which will be more fully described hereinafter, comprises a body formed with a lower diaphragm chamber and an upper diaphragm chamber arranged at right angles to the lower chamber. The body also comprises a fluid inlet, which is connected to a source of fluid under variable pressure, and a fluid outlet leading from the lower diaphragm chamber and connected to the place of use of the fluid. A flexible diaphragm separates the lower diaphragm chamber into upper and lower spaces and a flexible diaphragm separates the upper diaphragm chamber into right and left hand spaces. The upper space of the lower diaphragm chamber is in constant communication with the left hand space of the upper diaphragm chamber through a port or passage.

The variable pressure fluid inlet communicates with a valve chamber having an outlet orifice, the flow of fluid through which orifice is controlled by a valve which is adjustable axially from the exterior of the body and can thus control the pressure drop through the orifice. The outlet orifice communicates with the lower space of the lower diaphragm chamber and the upper space of the latter communicates with the variable pressure fluid inlet at a position upstream of the valve chamber.

A valve attached to the lower face of the diaphragm in the lower diaphragm chamber controls the opening and closing of the outlet from the body and a spring acting upon the lower face of the diaphragm tends to thrust the diaphragm upwards. Another spring which reacts between the upper face of the diaphragm and a member slidable in the wall between the upper and lower diaphragm chambers tends to thrust the diaphragm downwards and the said member upwards. The said member cooperates with a cam carried on a cam member which is slidably arranged in the upper diaphragm chamber and has one end attached to one face of the diaphragm in the chamber, the other face of the diaphragm being acted upon by a spring.

A modified construction differs from the construction briefly described above in the following main respects. In the upper diaphragm chamber the spring which acts upon the diaphragm is arranged on the same side of the diaphragm as the cam member. The variable pressure fluid inlet is connected directly to the upper space of the lower diaphragm chamber and the upper space is connected to the inlet to the casing of a centrifugal impeller, the outlet from which is connected to the said valve chamber containing the adjustable valve and also to the space in the upper diaphragm chamber on the opposite side of the diaphragm from the cam member.

In this construction the pressure difference across the outlet from the valve chamber is generated by the centrifugal impeller.

Figure 2:
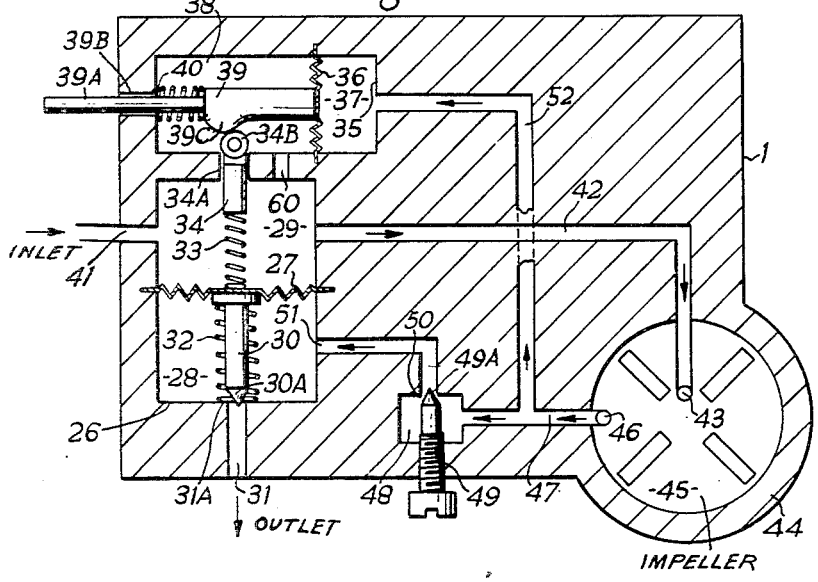

Two constructional forms of the invention will now be described, by way of example with reference to the accompanying drawings, and in the description it will be assumed that the flow control valve assembly is arranged vertically. In the drawings:

Figure 1 is a diagrammatic sectional elevation of one construction in which the inlet of the variable pressure fluid to the valve assembly is directly connected to a chamber housing an adjustable valve by means of which the desired pressure drop is created across an outlet orifice from the chamber with which the valve is adapted to cooperate; and Figure 2 is a diagrammatic sectional elevation of a modified construction which comprises a centrifugal impeller, the inlet to which is in communication with the inlet of the variable pressure fluid to the valve assembly, the outlet from the impeller being connected to the chamber in which the said adjustable valve is mounted.

Referring to Figure 1:

The device comprises a body member 1 having a fluid inlet conduit 1A extending from the right-hand side of the body of the valve assembly into a valve chamber 2, the upper part of which is connected by a conduit 3 to a lower diaphragm chamber 4. Substantially centrally between the top and bottom ends of the diaphragm chamber 4 there is a flexible diaphragm 5 which is rigidly fixed at its outer edge and extends transversely across the chamber and thus divides the latter into two compartments or spaces, that is, an upper space 6 and a lower space 7 as shown in the drawings. The valve chamber 2 is connected by the said conduit 3 to the lower space 7 below the diaphragm 5. Upstream of the valve chamber 2 the inlet duct 1A is also connected by a conduit 9 to the upper space 6 of the lower diaphragm chamber 4 above the diaphragm 5. An adjustable needle valve member 10 is threaded through a threaded hole in the base of the body 1 and extends upwardly through the valve chamber 2, the top end 11 of the valve being tapered and being adapted to open and close to any desired degree the orifice 3A formed by the lower end of the above-mentioned conduit 3 which connects the valve chamber with the lower space 7 of the lower diaphragm chamber.

On its underside, the diaphragm 5 carries a needle valve member 12 which extends downwardly from the diaphragm through the lower space 7 and the tapered end 13 of which is adapted to open and close the upper end 14A of a fluid outlet conduit 14 formed in the body 1 of the valve assembly. The diaphragm 5 is normally thrust upwards by means of a coil spring 15 which surrounds the valve stem.

The upper space 6 of the lower diaphragm chamber 4 is in constant communication with an upper diaphragm chamber 16 by means of a passage 17 interconnecting the two diaphragm chambers.

The cylindrical end 18A of a cam member 18 is slidably arranged in a hole 18B formed in the wall of the valve assembly body 1 at the left-hand end of the upper diaphragm chamber 16. The end 18A of the cam member projects out of the chamber and within the latter the cam member carries a downwardly projecting cam lobe 18C of substantially angular profile which extends downwards and co-operates with a roller 19 carried at the upper end of a piston or plunger 20 which is slidably arranged in a bore 20A interconnecting the upper and lower diaphragm chambers 16 and 4. The piston 20 is normally pressed upwards, so that the roller will contact with the cam 18C, by means of a coil spring 21 which reacts between the diaphragm 5 in the lower diaphragm chamber 4 and the lower end of the piston.

The right-hand end of the slidable cam member 18 is fixed to a vertically-arranged flexible diaphragm 22, the outer edge of which is rigidly fixed and which divides the upper diaphragm chamber 16 into a left-hand space 23 and a right-hand space 24 which latter is provided with a suitably dimensioned vent 24A. The diaphragm 22 is normally thrust to the left in a direction to disengage the cam 18C from the roller 19, as shown in Fig. 1, by means of a coil spring 25 which reacts between the end wall of the right-hand space 24 of the upper diaphragm chamber and the diaphragm 22.

The position of the cam 18C is determined by the equation of the load imposed by the said spring 25 on the right of the diaphragm 22 in the upper diaphragm chamber 16 with the force exerted at a pressure $P_1$ acting in the opposite direction on the diaphragm. By its action on the piston 20, the cam 18C determines the load on the spring 21.

Through the conduit 17, there is communication between the upper space 6 of the lower diaphragm chamber 4 and the left hand space 23 of the upper diaphragm chamber 16.

If, now:

The force exerted by the spring 15 acting on the underside of the lower diaphragm 5 is $F_1$.

The force exerted by the spring 21 acting on the upper side of the lower diaphragm 5 is $F_2$.

The force exerted by the spring 25 acting on the upper diaphragm 22 is $F_3$.

The area of the lower diaphragm 5 is $A_1$.

The area of the upper diaphragm 22 is $A_2$.

The variable inlet pressure is $P_1$ and the pressure in the conduit 3 beyond the orifice 3A is $P_2$.

The lower diaphragm 5 will take up a position where the upward and downward forces acting on it are balanced. Since i.e., $$F_1 + P_2 A_1 = F_2 + P_1 A_1$$

$$P_1 - P_2 = F_1 - F_2 = \frac{F}{A_1}$$

where F is the net force acting on the diaphragm.

Now considering the cam 18C, the forces acting on the upper diaphragm 22, which acts as a controller diaphragm, are also in equilibrium, i.e., $P_1 A_2 = F_3$.

This means that the position of the cam 18C in relation to the roller 19 on the piston 20 is determined by the value of $P_1$.

The position of the cam 18C together with the contour of its cam surface determines the amount of compression of the spring 21 and therefore its load $F_2$.

It can now be seen that the pressure drop $P_1 - P_2$ across the orifice 3A with which the adjustable needle valve 11 co-operates is determined by the position and shape of the cam 18C as the pressure drop is equal to $F/A_1$ and, as the position of the cam is determined by the variable inlet pressure $P_1$, the shape of the cam surface will determine the relation between the value of $P_1$ and the pressure drop across the orifice 3A. As the flow through the orifice is proportional to the square root of the pressure drop across it, it is possible by a suitable selection of dimensions for the components and by suitably shaping the said cam surface to obtain any desired relationship between the inlet pressure $P_1$ and the flow through the valve.

In the modified constructional form of the invention shown in Fig. 2, the body 1 of the valve assembly comprises a lower diaphragm chamber 26 divided by a transverse flexible diaphragm 27, which is rigidly fixed around its periphery, into a lower space 28 and an upper space 29. As in the case of the other construction described above with reference to Fig. 1, a needle valve member 30 is carried at the underside of the diaphragm and the tapered end 30A of the valve stem co-operates with the inner end 31A of an outlet duct 31. The diaphragm 27 is pressed upwards by a coil spring 32 and downwards by a coil spring 33 which reacts between the upper face of the diaphragm and a piston 34, which is slidable in a hole 34A in the wall separating the lower diaphragm chamber 26 from an upper diaphragm chamber 35. The chamber 35 is divided by a flexible diaphragm 36, which is rigidly fixed around its periphery, into a right hand space 37 and a left hand space 38. The left hand space 38 of the upper diaphragm chamber 35 and the upper space 29 of the lower diaphragm chamber 26 are put into communication through a passage 60. In this modified construction, however, the left hand end of a cam-carrying member 39, having a cylindrical part 39A, which is slidable in a hole 39B in the wall of the valve assembly 1, is fixed to the diaphragm 36 in the upper diaphragm chamber and the diaphragm is pressed to the right by a coil spring 40 which acts upon the cam-carrying member, which latter carries a cam 39C of angular profile. A roller 34B carried by the piston 34 is pressed against the cam 39C by the spring 33.

The inlet 41 for the variable pressure fluid is formed in the left hand side of the valve assembly body 1 and communicates directly with the upper space 29 of the lower diaphragm chamber 26; and extending from the upper space 29 there is a conduit 42 which leads to a fluid inlet 43 connected to the casing 44 of a conventional centrifugal impeller diagrammatically shown at 45. The outlet 46 from the impeller casing is connected by a conduit 47 to a valve chamber 48 containing a threaded adjustable valve 49, the tapered end 49A of which co-operates with the end orifice 50 of a conduit 51 leading to the lower space 28 of the lower diaphragm chamber 26. Another conduit 52 connects the said conduit 47, connected to the impeller fluid outlet 46, to the right hand space 37 of the upper diaphragm chamber 35 on the opposite side of the diaphragm 36 from the cam-carrying member 39.

The pressure difference across the said orifice 50 with which the adjustable valve 49A co-operates is generated by the centrifugal impeller 45.

The fluid inlet pressure from the inlet 41 (which may be designated $P_1$) passes into the space 29 and into the conduit 42 to be delivered to the inlet 43 of the impeller 45; this inlet pressure within the space 29 acts upon the upper face of the diaphragm 27 in the lower diaphragm chamber 26 and, also, passes through the passage 60 and acts upon the left hand face of the diaphragm 36 in the upper diaphragm chamber 35. The pressure from the outlet 46, of the fluid discharged from the impeller (which may be designated $P_2$), passes through passage 52 and acts upon the right hand face of the diaphragm 36 in the upper diaphragm chamber 35 and also passes to the adjustable valve chamber 48. The pressure $P_2$ in the valve chamber 48 is reduced in the conduit 51 (to a value designated $P_3$) by the adjustable valve 49A cooperating with the orifice 50 and this reduced pressure acts upon the lower face of the diaphragm 27 in the lower space 28 of the lower diaphragm chamber.

In the case of this modified construction $P_2 = P_1 + C_1 N^2$ wherein $C_1$ is a constant for any given impeller and operating fluid and N is the rotational speed of the impeller.

The diaphragm 27 in the lower diaphragm chamber 26 is in equilibrium under upward and downward forces i.e.:

$$P_3 A_3 + F_4 = P_1 A_3 + F_5$$

wherein the area of the diaphragm 27 is $A_3$, the force exerted by the spring 32 acting upwards on the diaphragm 27 in the lower space 28 of the diaphragm chamber 26 is $F_4$, and the force exerted by the spring 33 acting downwards on the same diaphragm is $F_5$. Then $$P_3 A_3 + F_4 = P_2 A_3 - A_3 C_1 N^2 + F_5$$

and $$P_2 A_3 - P_3 A_3 = F_4 + A_3 C_1 N^2 - F_5$$

$= \text{constant} + C_2 N^2 - F_5$, wherein $C_2$ is a constant, i.e. $C_2 = A_3 C_1$.

As in the case of the construction shown in Figure 1 the position of the cam 39C is determined by:

$$P_2 A_4 = P_1 A_4 + F_6$$

where the area of the diaphragm 36 is $A_4$ and the force exerted by the spring 40 is $F_6$ i.e. $F_6 = (P_2 - P_1) A_4 = C_1 N^2 A_4$.

It follows that $F_5$, the load exerted by the spring 33, is determined by the speed of the impeller and by the contour of the cam 39C on the cam-carrying member 39. Therefore, the pressure drop across the said orifice 50 and therefore the flow through the valve assembly is determined in a desired relationship to the pressure difference generated by the impeller 45 and therefore to the speed of the impeller.

It will be appreciated that the strengths of the springs and the areas of the diaphragms are so selected as to obtain the desired result.

It will be understood that the diaphragms may be replaced by pistons slidable in cylinders corresponding to the diaphragm chambers.

That which is claimed, as new and to be secured by Letters Patent is:

1. A fluid flow control device for causing the flow of fluid to be in a desired relationship with respect to a selected variable characteristic of the fluid, said device comprising a body member having therein a variable pressure fluid inlet opening and a pressure chamber; pressure actuated means within said chamber and dividing it into pressure compartments and responsive to pressure in said compartments, one of which compartments having an orifice discharging thereinto and having a fluid outlet opening; means communicating said inlet opening with said orifice and with the second of said compartments; a valve member mounted for adjustment to and from said orifice to permit delivery of a reduced pressure to said first compartment and acting to increase the pressure of the variable pressure fluid at said inlet opening; a valve member disposed to control said outlet opening, means normally biasing said valve member to opening position, said valve member being mounted to be moved to closing position by said pressure actuated means; a second chamber containing a pressure actuated means and communicating on one side of said last mentioned means with said second compartment of said first chamber to subject said pressure-actuated means to pressure therefrom and means normally subjecting said pressure-actuated means to an opposing pressure on its other side, and a pressure control means actuated by said pressure actuated means in the second chamber and disposed to apply pressure on the pressure actuated means in said first chamber in opposition to the fluid pressure in the first compartment of said first chamber for determining the relation between the value of the pressure of the fluid entering the inlet opening and the pressure drop across the said orifice and to position said outlet valve accordingly.

2. A fluid control device according to claim 1 further characterized by the means communicating said inlet opening with said orifice and with the said second compartment of the first pressure chamber including a pressure generating means connected in a flow path between said second compartment and said orifice and discharging into said orifice and into said second pressure chamber to act upon the side of the pressure actuated means therein in opposition to the pressure from the second compartment of said first chamber.

3. The subject matter of claim 2, further characterized by a spring acting upon the pressure-control means in said second chamber in opposition to the pressure on the other side of said pressure-actuated means in said second chamber from the outlet of said pressure-generating means.

4. A fluid control device comprising a body member having therein a pressure chamber and a fluid inlet opening for variable pressure fluid, a first diaphragm mounted in and dividing the chamber into two spaces, an adjustably controlled orifice in communication with said inlet opening and discharging into one of said spaces which space has a fluid outlet opening leading therefrom for the device, a valve for said outlet mounted to be closed by said first diaphragm and means normally biasing said valve member to open position, the second of said spaces being in direct communication with the variable pressure inlet opening at a point in advance of said orifice, so that one side of the diaphragm is subjected to reduced pressure of the fluid passing through said orifice while its other side is subjected to the pressure of the variable pressure fluid entering said fluid inlet; a second pressure chamber, a second controlling diaphragm mounted in said second chamber and dividing it into two spaces and normally subjected to pressure in one of said spaces, a conduit communicating the other of said last mentioned spaces in said second chamber with the second space of the first mentioned chamber; and pressure-control means in said other space of the second chamber and positioned to be actuated by said second diaphragm and to apply or relieve pressure to one side of said first diaphragm in opposition to the pressure of the fluid passing thereinto from said orifice in its determination of the relationship between the value of the pressure of the fluid entering said inlet opening and the pressure drop across said orifice and to position said outlet valve accordingly.

5. A fluid control device according to claim 4, wherein said pressure-control means comprises a slidable cam member actuated by said second diaphragm and which applies pressure to said first diaphragm through a slidable plunger member and a spring which reacts between said plunger and said first diaphragm in the first chamber.

6. A fluid flow control device according to claim 5, wherein the means normally biasing the outlet valve to open position is a spring mounted to move said first diaphragm in opposition to the fluid pressure applied on the opposite side of said first diaphragm and to the pressure of the said spring which reacts between the said plunger member and said first diaphragm.

7. A fluid flow control device according to claim 5, wherein there is a spring in the first of said spaces of said second pressure chamber to normally subject the said second diaphragm to constant pressure in opposition to the fluid pressure passing from said second space of the first chamber into the second space of said second chamber and hence controlling the position of said cam member for determining the load on the spring between said plunger member and said first diaphragm.

References Cited in the file of this patent

UNITED STATES PATENTS

| | | |
|---|---|---|
| 2,139,050 | Vickers | Dec. 6, 1938 |
| 2,217,635 | Bailey | Oct. 8, 1940 |